United States Patent Office 3,182,695
Patented May 11, 1965

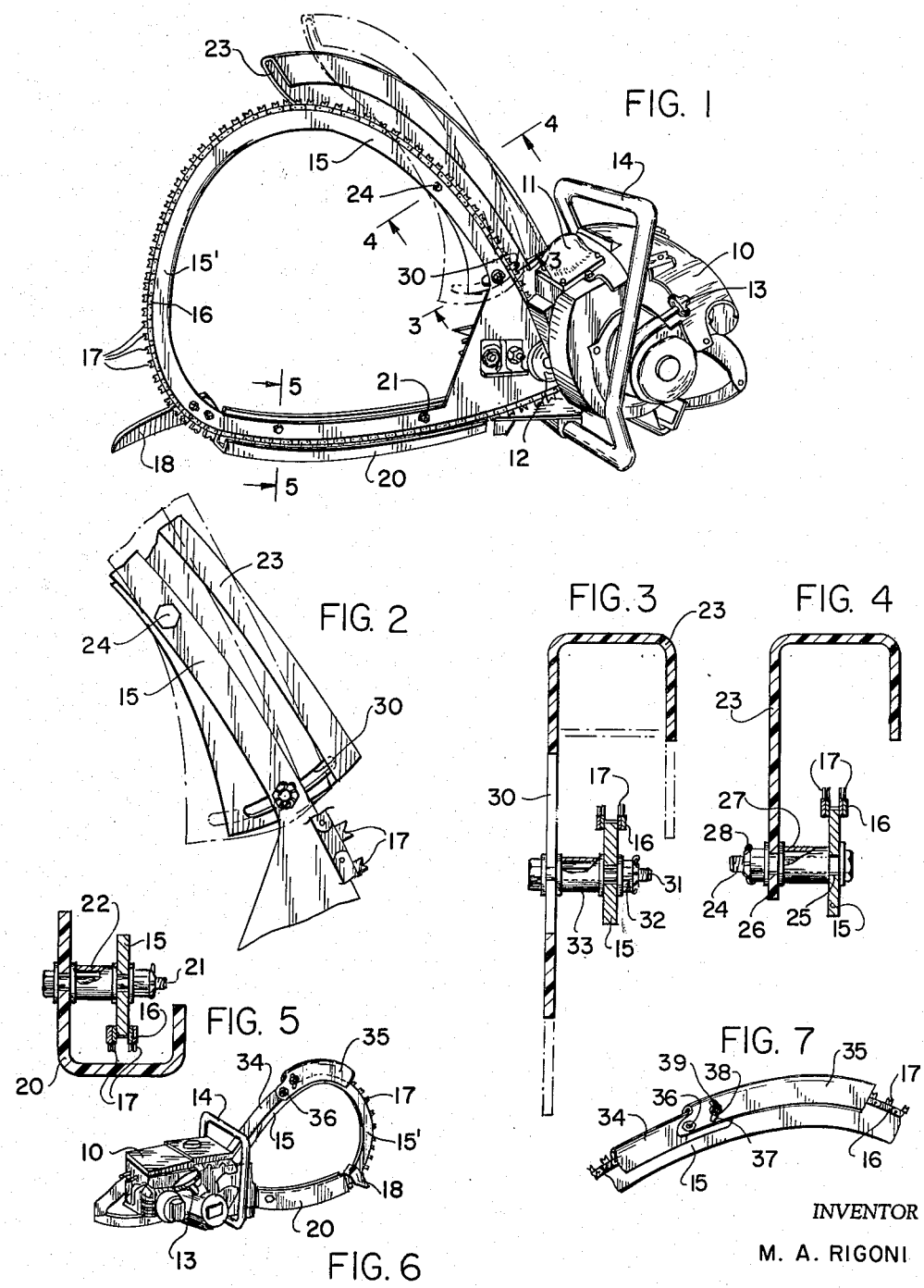

3,182,695
SAFETY GUARD FOR CHAIN SAWS
Matt A. Rigoni, Perry, Fla., assignor to Beaugard, Inc., Perry, Fla., a corporation of Florida
Filed Apr. 29, 1963, Ser. No. 276,333
4 Claims. (Cl. 143—32)

This invention relates to safety and to the protection of workmen, especially those employed in the sawing of trees, branches and lumber by portable power-driven apparatus.

The invention relates particularly to safety guards for a chain saw of the lightweight bow type, in which at least one of such guards is adjustable to accommodate trees of various sizes and which will protect the workman from the saw teeth as well as from the material which may be carried by the teeth towards him, such as adjacent vegetation.

Heretofore chain saws of various kinds have been provided, some of which have had fixed partial guards and some of which have had pivotally mounted guards to protect the workmen during certain phases of the operation. A common type of chain saw has been the bar type having a relatively long, narrow plate over which a chain with teeth is disposed along generally parallel paths of travel.

The bar type chain saw has been unwieldy in some situations such as the felling of small trees and underbrush, the removing of limbs and the cutting of the trunk into relatively small pieces for ease of handling. To perform these functions, the bow type chain saw of roughly triangular shape has been developed in which the effective cutting area of the saw is disposed on the side opposite the operator. This type of saw has the disadvantage that the saw tends to "kick-back" onto the operator which has resulted in some very disfiguring accidents. Also, the saw engages small limbs and underbrush and whips them against the operator. Some of these saws have been provided with guards extending partially along the portion of the saw adjacent to the operator, however, these guards have been fixed and were relatively short so that they did not extend to a position adjacent to the cutting portion of the saw to give adequate protection to the workman.

It is an object of the invention to provide a bow type chain saw having a generally triangular shape with a fixed guard disposed along one portion of the saw adjacent to the operator and a pivoted guard disposed along the opposite side of the saw adjacent to the operator to offer protection along the non-cutting portions of the saw.

Another object of the invention is to provide a bow type chain saw with safety means to prevent small limbs and underbrush from whipping back against the operator.

A further object of the invention is to provide a bow type chain saw having safety means extending along both sides from a position adjacent to the operator to a position adjacent to the effective cutting area of the saw.

A further object is to provide a bottom guard on which the saw may rest during starting.

A still further object of the invention is to provide a bow type chain saw having a generally triangularly shaped frame with safety guards which in section are generally J-shaped extending along both sides of the frame adjacent to the operator and at least one of such guards being mounted for pivotal movement within a restricted range on the saw frame at a location intermediate the ends of the guard.

Other objects and advantages of the invention will be apparent from the following description taken in conjunction with the accompanying drawing in which:

FIG. 1 is a perspective illustrating a bow saw with the guards of the present invention attached thereto;

FIG. 2, an enlarged fragmentary side elevation of a portion of the adjustable guard;

FIG. 3, an enlarged section taken along the line 3—3 of FIG. 1;

FIG. 4, an enlarged section taken along the line 4—4 of FIG. 1;

FIG. 5, an enlarged fragmentary detail section taken along the line 5—5 of FIG. 1;

FIG. 6, a perspective on a reduced scale illustrating a modified form of the invention; and FIG. 7, an enlarged fragmentary side elevation of the upper guard of FIG. 6.

Briefly stated the present invention is a lightweight portable bow type chain saw including a generally triangularly shaped frame and having a safety guard disposed along both sides of such frame adjacent to the operator. The safety guards are generally J-shaped in cross section and extend outwardly from the source of power of the saw to a position adjacent to the cutting portion thereof and at least one of the safety guards is pivotally mounted intermediate its ends on the framework of the saw in spaced relation to the source of power and has means for adjusting the outer end of such guard toward and away from the chain saw and means for maintaining such guard in adjusted position.

With continued reference to the drawing an internal combustion engine or other source of power 10 is provided having a reduction drive 11 which drives a sprocket 12. The engine 10 may be started in any desired manner as by an automatic rewind starter cord 13 and such engine may have an operating and manipulating handle 14 attached thereto. A generally triangular bow type frame 15 is attached at the apex of the triangle to the engine 10 in any desired manner so that the base of the triangle 15' defines the effective cutting area. An endless chain 16 having saw teeth 17 is slidably mounted on the frame and extends around and is driven by the sprocket 12 so that when the chain is placed against a tree or other object which can be cut, the saw teeth 17 will sever such object. A foot or support 18 is mounted on the lower portion of the frame adjacent to the cutting area to engage the log during sawing. When the engine 10 is started the saw may be rested on a guard 20 to maintain the teeth out of engagement with the ground or other supporting surface.

In order to protect the operator and to keep the chain 16 out of engagement with the ground when not in use, the lower guard 20 which is substantially J-shaped in cross-section, is connected to the lower leg of the frame 15 by fasteners 21 and is maintained in spaced relation therewith by spacers 22. The guard 20 extends from a position adjacent to the engine 10 outwardly to a position adjacent to the cutting area 15' remote from such engine.

An upper guard 23, also substantially J-shaped, is mounted on the upper leg of the frame 15 and such upper guard preferably is pivoted to afford the maximum protection while accommodating tree trunks of relatively large diameter. In order to pivotally mount the upper guard, a bolt or pivot pin 24 passes through an opening 25 in the frame and spaced a substantial distance from the engine 10, and through an opening 26 in the guard 23. The guard and the frame are separated by a spacer 27 and are held in position by a castellated nut 28. To control the amount of movement of the upper guard, a radial slot 30 is provided adjacent to the inner end thereof and such slot receives a bolt or pin 31 secured to the frame 15 by a castellated nut 32. A spacer 33 of substantially the same size as the spacer 27 is disposed intermediate the frame 15 and the upper guard 23.

If desired the guards 20 and 23 may be molded of fiberglas or other plastic or such guards may be formed from sheet metal or the like. The guards preferably are colored a relatively bright color which may be molded into the fiberglas or plastic and which would make the saw more easily visible.

The guards preferably are substantially J-shaped in cross-section so that they can be easily mounted on the frame 15 in such a manner that the chain may be removed without removing the guards. The fulcrum or bolt 24 is located in spaced relation with the engine so that when the guard is pivoted outwardly the saw teeth will still be covered for a substantial distance. Likewise small branches and underbrush will be trapped and severed a greater distance from the operator.

As illustrated in FIGS. 6 and 7 bow type chain saws which are provided with a partial guard 34 may have a lower safety guard 20 attached thereto as previously described. The free end of the fixed guard may have an adjustable extension guard 35 pivotally connected thereto by a pivot pin 36 and such extension guard may have a radial slot 37 for the reception of the pin 38 and nut 39 for fastening such extension guard in adjusted position.

In the operation of the device the guards 20 and 23 normally are positioned closely adjacent to the chain 16 and extend from a position adjacent to the engine 10 outwardly to a position adjacent to the cutting portion of the chain. Should the saw engage the wood and kick back against the operator, he will be protected from the saw teeth. Likewise, the guards 20 and 23 will prevent the saw teeth along the portion of the frame adjacent to the operator from engaging small limbs and underbrush and prevent whipping such limbs or underbrush against the operator as well as preventing articles of clothing from becoming entangled in the saw teeth. When a tree trunk is encountered which is of greater diameter than the width between the saw guards the outer end of the upper guard may be pivoted upwardly to increase the effective cutting area of the saw merely by depressing the inner end and pivoting the upper guard 23 about the bolt 24. The frictional resistance to such adjustment may be varied by adjustment of the nut 32.

It will be apparent from the foregoing that a relatively simple bow type chain saw is provided having a safety guard disposed along both portions of the frame adjacent to the engine to protect the operator in the event that the saw should accidentally come into contact with him and that at least one of such guards is adjustable relative to the other guard and the saw for increasing the effective cutting area thereof.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. A bow type chain saw comprising a generally triangularly shaped frame having two side portions and an end portion, power means mounted on said frame at the apex of said side portions, a chain having cutting teeth movably mounted on said frame and driven by said power means, a fixed guard mounted on said frame along one of said side portions, a movable guard mounted on said frame along the other side portion, a pivot mounting said movable guard on said frame a substantial distance from said power means, said movable guard having an arcuate slot disposed radially of said pivot and located adjacent to the end of the guard which is adjacent to said apex, a pin on said frame adjacent to said power means and positioned within said slot for limiting the movement of said movable guard, said fixed guard and said movable guards being generally J-shaped in cross-section whereby said chain can be removed from said frame without removing said guards.

2. In combination with a lightweight portable bow type chain saw having a generally triangular frame with oppositely disposed sides, an apex, and a transverse cutting portion, power means at the apex and an endless cutting chain movably supported thereby, safety guards comprising a first guard of generally J-shaped cross-section mounted on one side of said frame and laterally spaced therefrom, a second guard of generally J-shaped cross-section pivotally mounted on the other side of said frame intermediate said apex and said transverse cutting portion and said transverse cutting portion and spaced a substantial distance from each in a position remote from said first guard, said second guard having an arcuate slot disposed radially of said pivot, and pin means disposed in said slot for limiting the movement of said guard whereby the operator of the chain saw will be protected from engagement therewith.

3. The structure of claim 2 in which said guards extend outwardly to a position adjacent to the cutting edge of said chain saw.

4. A bow type chain saw of generally triangular shape comprising a frame, power means mounted at the apex of the frame, an endless toothed chain driven by said power means and about said frame, a guard mounted on said frame in a position to overlie said chain, said guard extending along one side of said frame and being pivotally mounted on said side at a position substantially spaced from said apex, said guard being rockable to alternately expose or cover a portion of said chain along an outer end portion of said frame.

References Cited by the Examiner
UNITED STATES PATENTS

| | | | |
|---|---|---|---|
| Re. 15,294 | 2/22 | Lofgren | 143—32 X |
| 1,335,694 | 3/20 | Norris | 143—32 |
| 2,618,298 | 11/52 | Pratt | 143—32 |
| 3,059,673 | 10/62 | Woleslagle | 143—32 |

WILLIAM W. DYER, Jr., *Primary Examiner.*

DONALD R. SCHRAN, *Examiner.*